United States Patent
An

(10) Patent No.: US 7,522,228 B2
(45) Date of Patent: Apr. 21, 2009

(54) LIQUID CRYSTAL DISPLAY DEVICE

(75) Inventor: Su-Young An, Chungcheongnam-Do (KR)

(73) Assignee: LG Display Co., Ltd., Seoul (KR)

( * ) Notice: Subject to any disclaimer, the term of this patent is extended or adjusted under 35 U.S.C. 154(b) by 25 days.

(21) Appl. No.: 10/875,549

(22) Filed: Jun. 25, 2004

(65) Prior Publication Data
US 2005/0105011 A1 May 19, 2005

(30) Foreign Application Priority Data
Nov. 19, 2003 (KR) ............... 10-2003-0082282

(51) Int. Cl.
G02F 1/1333 (2006.01)
(52) U.S. Cl. .............................. 349/58; 349/65
(58) Field of Classification Search ............ 349/58, 349/38
See application file for complete search history.

(56) References Cited

U.S. PATENT DOCUMENTS

| 6,507,484 | B2 * | 1/2003 | Fukuyoshi | 361/681 |
| 7,006,168 | B2 * | 2/2006 | Lee | 349/58 |
| 2002/0113918 | A1 * | 8/2002 | Hiratsuka et al. | 349/65 |
| 2003/0122992 | A1 * | 7/2003 | Hayashimoto et al. | 349/58 |
| 2004/0114372 | A1 * | 6/2004 | Han et al. | 362/330 |

* cited by examiner

Primary Examiner—David Nelms
Assistant Examiner—Lucy P Chien
(74) Attorney, Agent, or Firm—Morgan Lewis & Bockius LLP

(57) ABSTRACT

A liquid crystal display (LCD) device, comprising, a display panel having pixels arranged in a matrix configuration, a main supporter supporting a rear edge and a side of the display panel, a top case coupled to a side of the main supporter and pressing an upper edge of the display panel, and a lower cover supporting a backlight assembly coupled to the side of the main supporter and having at least one guide supporting the side of the main supporter.

10 Claims, 3 Drawing Sheets

REATED ART

LIQUID CRYSTAL DISPLAY DEVICE

This application claims the benefit of Korean Patent Application No. 2003-082282, filed on Nov. 19, 2003, which is hereby incorporated by reference.

BACKGROUND OF THE INVENTION

1. Field of the Invention

The present invention relates to a liquid crystal display (LCD) device, and more particularly, to an LCD device having a coupling structure.

2. Description of the Related Art

In general, an LCD device displays a desired image by individually providing a data signal to pixels arranged in a matrix configuration according to image information, thereby controlling light transmittance of the pixels. Accordingly, the LCD device includes a display panel where pixels are arranged in the matrix configuration and a driving unit for driving the pixels.

The display panel includes a thin film transistor array substrate and a color filter substrate bonded to each other by a uniform cell-gap, and a liquid crystal layer formed at an isolation interval between the color filter substrate and the thin film transistor array substrate. The display panel is provided with a common electrode and a pixel electrode to apply an electric field to the liquid crystal layer. Accordingly, if a voltage of a data signal applied to the pixel electrode is controlled in a state that a voltage has been applied to the common electrode, liquid crystals of the liquid crystal layer are rotated according to the electric field generated between the common electrode and the pixel electrode by dielectric anisotropy, thereby transmitting or cutting off light pixel by pixel to display text or an image.

In addition, the LCD device cannot emit light by itself, but can display an image by controlling transmittance of light. For this reason, the LCD device requires a backlight assembly for emitting light to the display panel. The backlight assembly is divided into perpendicular-type and edge type devices. In the perpendicular-type device, a lamp is disposed at a rear surface of the display panel and light is directly transmitted to a front surface of the display panel. In the edge-type device, a lamp is disposed at at least one side of the display panel, and light is reflected, diffused, and collected through a light guide plate, a reflection plate, and sheets to be transmitted to the front surface of the display panel.

As mentioned above, the LCD device includes the display panel and the backlight assembly. In order to support and couple the display panel and the backlight assembly, various elements have been utilized, which will now be described in detail with reference to accompanying drawings.

FIG. 1 is a schematic cross-sectional view of an exemplary LCD device according to the related art. Referring to FIG. 1, the related art LCD device includes a display panel 10 where pixels are arranged in a matrix configuration, a main supporter 20 for supporting a rear edge and a side of the display panel 10, a top case 30 coupled to a side of the main supporter 20 by pressing an upper edge of the display panel 10, and a lower cover 50 coupled to a side of the main supporter 20 by a screw 51 and supporting a backlight assembly 40.

The backlight assembly 40 includes a reflection plate 41 provided at an upper surface of the lower cover 50, a light source part 43 having a plurality lamps 42 disposed on the reflection plate 41 to make light incident onto an entire rear surface of the display panel 10, a diffusion plate 44 corresponding to the entire rear surface of the display panel 10 to cover the light source part 43 and having a rear edge supported by the lower cover 50, and an optical sheet 45 disposed at an upper surface of the diffusion plate 44. The display panel 10 and the optical sheet 45 have a predetermined gap therebetween by a protrusion of the main supporter 20.

In a case where an edge area on which no image is displayed (i.e., a bezel) is formed in a minimum size, the LCD device is fabricated with the upper edge of the display panel 10, covered with the top case 30 and the main supporter 20 that are formed in a minimum size in effort to make a light and small LCD device in the same sized model. However, the related art LCD device has following problems.

When the LCD device is fabricated to have the upper edge of the display panel, covered with the top case 30 and the main supporter 20 that are made in the minimum size, the square frame-shaped main supporter 20 for supporting a lower edge of the display panel 10 and its side is vulnerable to surface tension parallel to the ground. Thus, the display panel 10 and the optical sheet 45 of the backlight assembly 40 supported by the main supporter 20 become detached from the main supporter 20 and are damaged by the protrusion of the main supporter 20.

Therefore, the related art LCD device utilizes the screw 51 to couple the side of the main supporter 20 and the lower cover 50, or a double sided tape to adhere them to each other, whereby the square frame shaped main supporter bar 20 is not affected by the surface tension parallel to the ground. However, it becomes complex and difficult to assemble the LCD device because of an additional operation for coupling the side of the main supporter 20 and the lower cover 50 by the screw 51, or adhering them by the double sided tape to ensure that the square frame shaped main supporter 20 is not affected by the surface tension parallel to the ground. Also, this additional operation causes deterioration in productivity of the LCD device. Moreover, fabrication costs are increased due to usage of subsidiary materials such as the screw 51, the double sided tape, or the like.

SUMMARY OF THE INVENTION

Accordingly, the present invention is directed to an LCD device that substantially obviates one or more problems due to limitations and disadvantages of the related art.

An object of the present invention is to provide an LCD device in which a main supporter is not affected by surface tension parallel to the ground.

Another object of the present invention is to provide an LCD device which can be assembled through a simplified operation to improve productivity and reduce fabrication costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display (LCD) device includes a display panel having pixels arranged in a matrix configuration, a main supporter supporting a rear edge and a side of the display panel, a top case coupled to a side of the main supporter and pressing an upper edge of the display pane;, and a lower cover supporting a backlight assembly coupled to the side of the main supporter and having at least one guide supporting the side of the main supporter.

In another aspect, an LCD device includes a display panel having pixels arranged in a matrix configuration, a main supporter supporting a rear edge and a side of the display panel, a top case coupled to the main supporter by a first hooking arrangement, and a lower cover supporting a backlight assembly and having at least one guide supporting the side of the main supporter, the lower cover being coupled to the main supporter by a second hooking arrangement.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
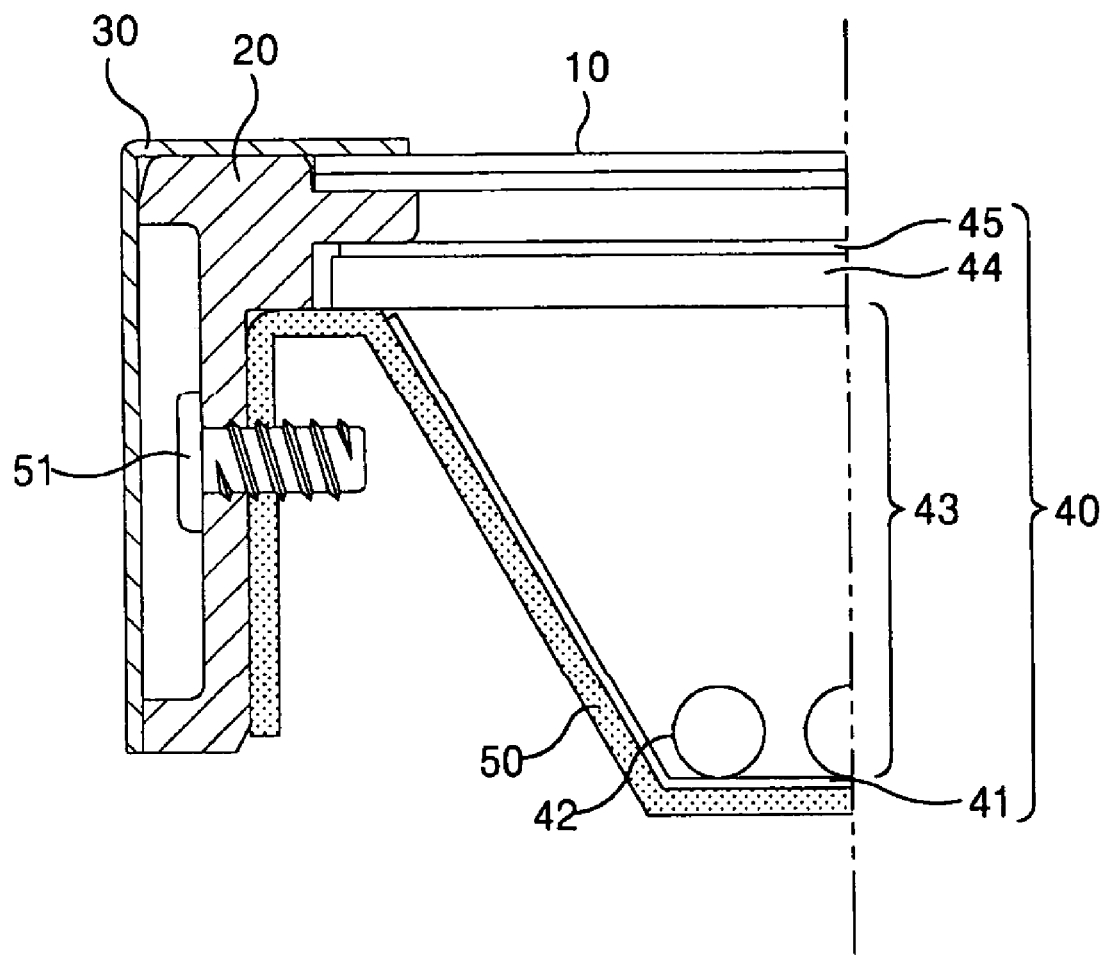
FIG. 1 is a schematic cross-sectional view of an exemplary LCD device according to the related art.
Figure 2:
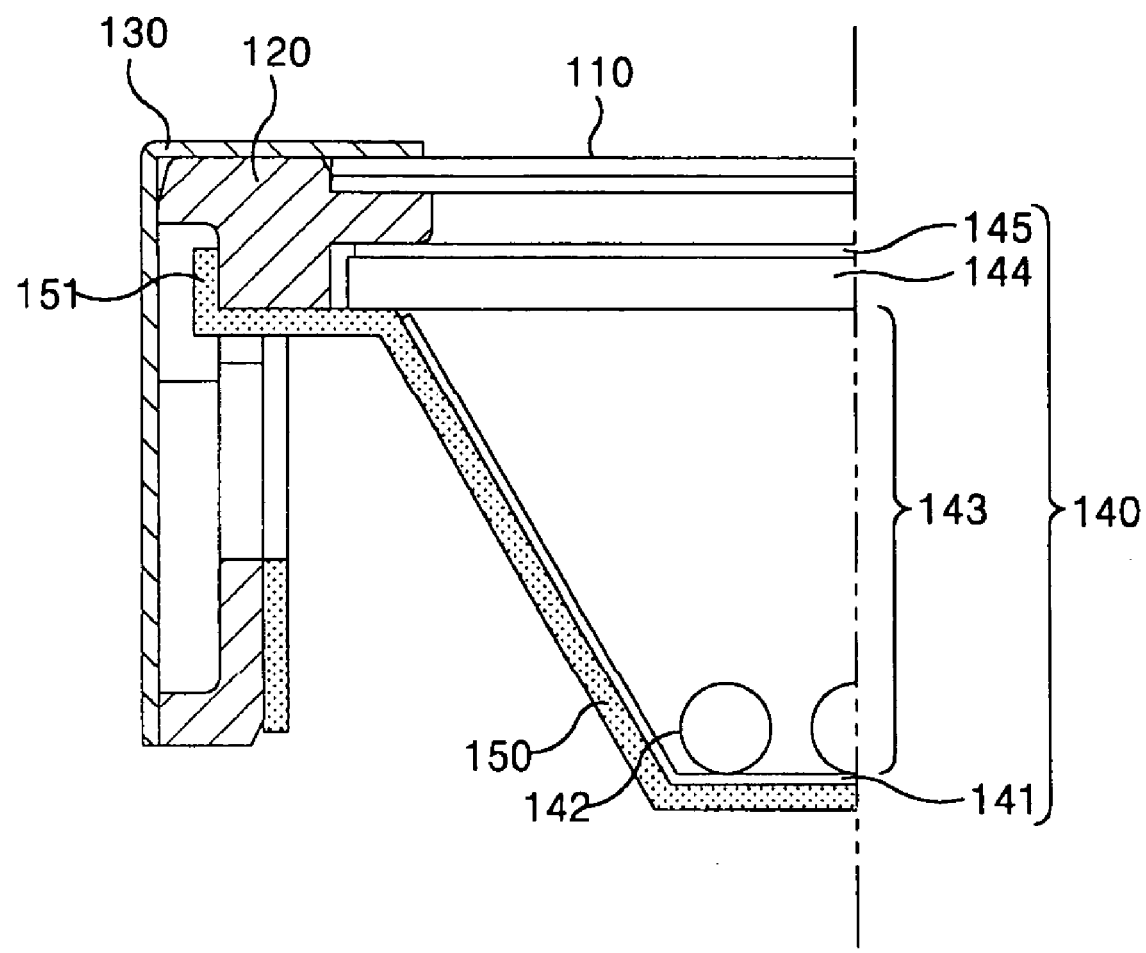
FIG. 2 is a schematic cross-sectional view of an exemplary LCD device in accordance with the present invention.

FIG. 2 is a schematic cross-sectional view of an exemplary LCD device in accordance with the present invention. As shown in FIG. 2, an LCD device may include a display panel 110 where pixels may be are arranged in a matrix configuration, a main supporter 120 supporting a-rear edge and a side of the display panel 110, a top case 130 coupled to a side of the main supporter 120 by pressing an upper edge of the display panel 110, and a lower cover 150 supporting a backlight assembly 140 to thereby be coupled to a side of the main supporter 120 and having a guide 151 supporting the side of the main supporter 120.

The display panel 110 may include a thin film transistor array substrate and a color filter substrate bonded to each other by a uniform cell-gap, and a liquid crystal layer formed at an isolation interval between the color filter substrate and the thin film transistor array substrate. Also, the display panel 110 may be provided with a common electrode and a pixel electrode to apply an electric field to the liquid crystal layer.

Accordingly, if a voltage of a data signal applied to the pixel electrode is controlled in a state that a voltage has been applied to the common electrode, liquid crystals of the liquid crystal layer may rotate according to the electric field generated between the common electrode and the pixel electrode by dielectric anisotropy, thereby transmitting and cutting off light pixel by pixel to display text or an image. In addition, in order to control a voltage of the data signal applied to the pixel electrode pixel by pixel, switching elements, such as thin film transistors and the like may be individually provided at the pixels.

Although not showing, a gate driving unit and a data driving unit may be coupled to the display panel 110 in various forms and connected to gate lines and data lines formed at the display panel 110, so that a scan signal and image information are supplied thereto to drive pixels of the display panel 110.

An upper edge of the display panel 110 may be pressed by the top case 130 may be coupled to a side of the mail support 120. The top case 130 and the main supporter 120 may be coupled by a hook method. For example, an insertion groove may be formed at the top case 130, a hook may be formed at the main supporter 120, and the top case 130 and the main case 120 may be coupled by inserting the hook of the main supporter 120 into the insertion groove of the top case 130. Alternatively, the hook may be formed at the top case 130 and the insertion groove may be formed at the main supporter 120.

The backlight assembly 140 may include a reflection plate 141 provided at an upper surface of the lower cover 150, a light source part 143 having a plurality lamps 142 disposed on the reflection plate 141 to make light incident onto an entire rear surface of the display panel 110, a diffusion plate 144 corresponding to the entire rear surface of the display panel 110 to cover the light source part 143 and having a rear edge supported by the lower cover 150, and an optical sheet 145 disposed at an upper surface of the diffusion plate 144. The display panel 110 and the optical sheet 145 may have a predetermined gap therebetween by a protrusion of the main supporter 120.

In FIG. 2, light emitted from the lamp 142 may be incident onto the diffusion plate 144 through the light source part 143. Accordingly, the reflection plate 141 provided at an upper surface of the lower cover 150 may reflect light incident onto the rear surface of the light source part 143 to reduce light loss. Here, the lower cover 150 may be fabricated having an inclined form, and the reflection plate 141 may be provided at an inclined upper surface of the lower cover 150, so that light incident onto the side of the light source part 143 may be reflected to the diffusion plate 144, thereby minimizing light loss.

The diffusion plate 144 may diffuse light incident from the light source part 143, thereby preventing a stain on an image displayed at the display panel 110 as light is partially collected and perpendicularly refracting an angle of light incident from the light source part 143.

In FIG. 2, the optical sheet 145 may be disposed at an upper surface of the diffusion plate 144. Although not shown, the optical sheet 145 may include a prism sheet and a diffusion sheet. The prism sheet collects light incident from the diffusion plate 144 and may uniformly distribute the light to the entire surface of the display panel 110. The protection sheet protects the optical sheet 145 from dust or scratches, prevents the optical sheet 145 from being moved when the backlight assembly 140 is carried, and diffuses light incident from the prism sheet, thereby distributing light more uniformly.

For the backlight assembly 140, a perpendicular-type or an edge-type device may be utilized. In the perpendicular-type device, a plurality of lamps may be provided at the light source part 143 and may be disposed corresponding to the entire rear surface of the display panel 110. In the edge-type device, a light guide plate may be disposed at the rear surface of the display panel 110 and a lamp may be disposed at at least one side of the light guide plate.

The backlight assembly 140 may be supported by the lower cover 150 that is coupled to a side of the main supporter 120. The lower cover 150 and the main supporter 120 may be coupled by a hook method. For example, a hook may be formed at the lower cover 150, an insertion groove may be formed at the main supporter 120, and the lower cover 150 and the main case 120 may be coupled by inserting the hook of the lower cover 150 into the insertion groove of the main supporter 120. Alternatively, an insertion hole may be formed at the lower cover 150 and a hook may be formed at the main supporter 120.

As described above, when no image is displayed in an edge area (i.e., a bezel) the LCD device may be fabricated with an upper edge of the display panel 110, covered with the top case 130 and the main supporter 120 that are formed in a minimum size to make a light and small LCD device in the same sized model. However, when the LCD device is fabricated to have the upper edge of the display panel 110, covered with the top case 130 and the main supporter 12P that are made in the minimum size, the square frame-shaped main supporter 120 for supporting the lower edge of the display panel 110 and its side becomes vulnerable to surface tension parallel to the ground. Thus, the display panel 110 and the optical sheet 145 of the backlight assembly 140 supported by the main supporter 120 may be detached from the main supporter 120 and become damaged by the protrusion of the main supporter 120.

Figure 3:
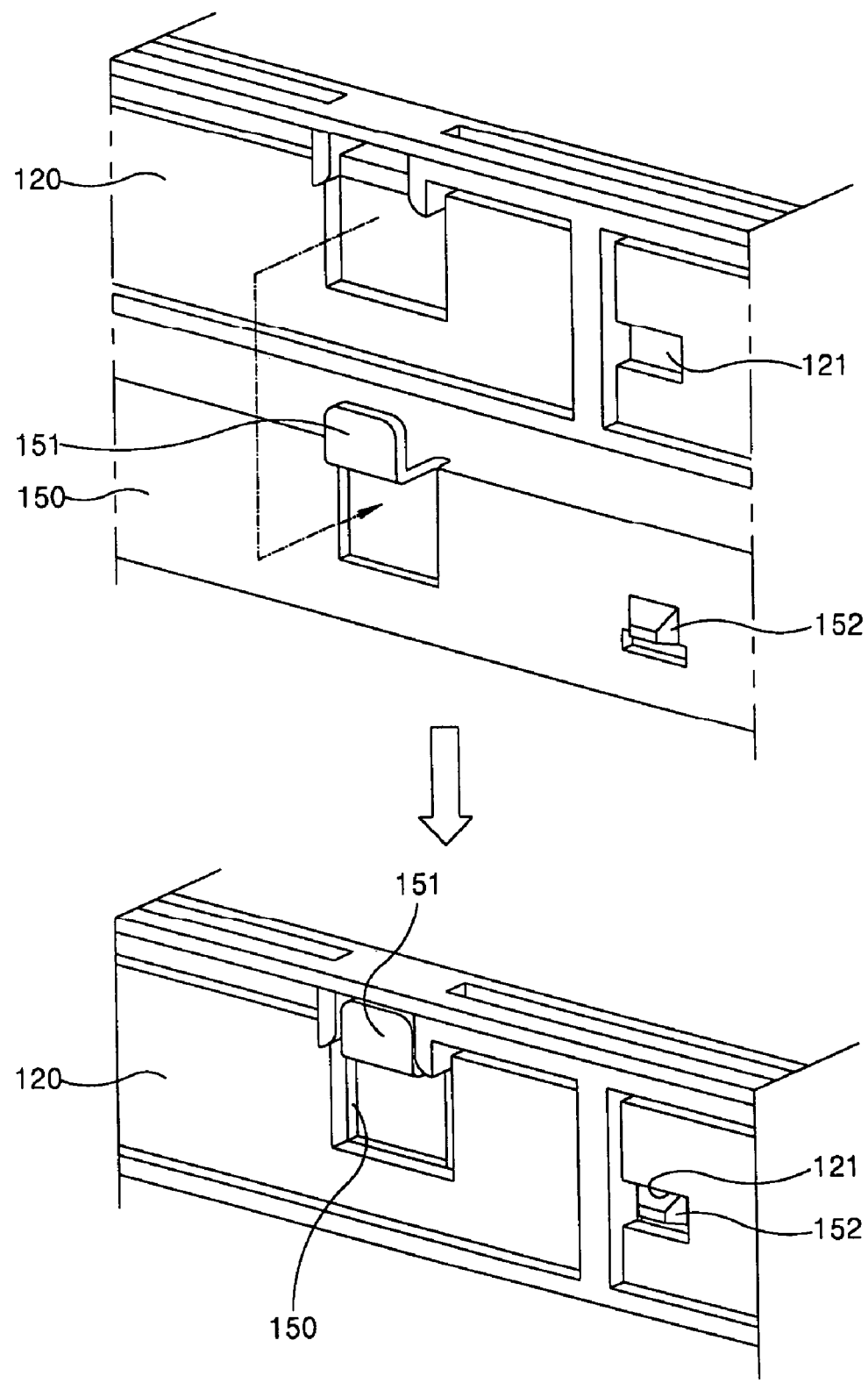
FIG. 3 is schematic perspective view of a lower cover and a main supporter coupled by a hook and a guide in the LCD device of FIG. 2 according to the present invention.

FIG. 3 is schematic perspective view of a lower cover and a main supporter coupled by a hook and a guide in the LCD device of FIG. 2 according to the present invention. As shown in FIG. 3, a guide 151 may be integrally formed at the lower cover 150 and may support the side of the main supporter 120 to ensure that the main supporter 120 is not affected by the surface tension parallel to the ground. For example, the lower cover 150 and the main supporter 120 may be coupled by a hook method, such that a hook 152 may be formed at the lower cover 150, an insertion groove 121 may be formed at the main supporter 120, and the hook 152 of the lower cover 150 may be inserted into the insertion groove 121 of the main supporter 120, so that the lower cover 150 and the main couple 120 may be firmly coupled to each other against the surface tension parallel to the ground.

In addition, the guide 151 may be integrally formed at the side of the lower cover 150 and may support the side of the main supporter 120 to further ensure that the main supporter 120 is not affected by the surface tension parallel to the ground. Here, a plurality of guides 151 may be formed at one side or both sides of the lower cover 150 and may support one side or both sides of the main supporter 120, or may be formed at every side of the lower cover 150 and support each side of the main supporter 120.

According to the present invention, a guide may be integrally formed at a lower cover and supports a side of a main supporter, so that the main supporter is not affected by the surface tension parallel to the ground. Accordingly, the LCD device in accordance with the present invention can be assembled through a simplified operation, its productivity is improved, and its fabrication cost is reduced.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a display panel having pixels arranged in a matrix configuration;
a main supporter supporting a rear edge and a side of the display panel, the side having first and second sides which are stepped each other;
a top case coupled to the main supporter by a first hooking arrangement having an inserting groove and a hook to be inserted into the inserting groove; and
a lower cover having a bottom to be directly contacted with the backlight assembly and a plurality of sides to support a backlight assembly and having at least one guide being integrally formed with the lower cover in the direction perpendicular to the bottom thereof to contact with the second side of supporter in order to support the side of the main supporter, the lower cover being coupled to the main supporter by a second hooking arrangement having an inserting groove and a hook to be inserted into the inserting groove,
wherein the first hooking arrangement is disposed in the first side of the main supporter and the second hooking arrangement is disposed in the second side of the main supporter.

2. The LCD device of claim 1, wherein the first hooking arrangement includes an insertion groove formed at the top case, and a hook formed at the main supporter and inserted into the insertion groove of the top case.

3. The LCD device of claim 1, wherein the first hooking arrangement includes an insertion groove formed at the main supporter, and a hook formed at the top case and inserted into the insertion groove of the main supporter.

4. The LCD device of claim 1, wherein the second hooking arrangement includes an insertion groove formed at the lower cover, and a hook formed at the main supporter and inserted into the insertion groove of the lower cover.

5. The LCD device of claim 1, wherein the second hooking arrangement includes an insertion groove formed at the main supporter, and a hook formed at the lower cover and inserted into the insertion groove of the main supporter.

6. The LCD device of claim 1, wherein the backlight assembly includes a plurality of lamps corresponding to an entire rear surface of the display panel.

7. The LCD device of claim 1, wherein the backlight assembly includes a light guide plate disposed at a rear surface of the display panel and a lamp disposed at least one side of the light guide plate.

8. The LCD device of claim 1, wherein the at least one guide is integrally formed at the lower cover.

9. The LCD device of claim 1, wherein the at least one guide includes a plurality of guides formed along at least one side of the lower cover.

10. The LCD device of claim 1, wherein the at least one guide includes a plurality of guides formed at each side of the lower cover.

* * * * *